June 22, 1965  W. H. METZGER, JR  3,189,990
METHOD OF PREPARING SMALL DIAMETER TUBES AND THE LIKE
Filed Feb. 25, 1963

INVENTOR
William H. Metzger, Jr.
BY
David Robbins
Alvin J. Englert  ATTORNEY
AGENT 3,189,990
METHOD OF PREPARING SMALL DIAMETER
TUBES AND THE LIKE
William H. Metzger, Jr., Rockville, Md., assignor to the United States of America as represented by the Secretary of Commerce
Filed Feb. 25, 1963, Ser. No. 261,253
2 Claims. (Cl. 29—423)

This invention relates to a method of preparing small diameter tubes and the like. More particularly it relates to a method of removing long, thin cores from electroforms and the like to prepare articles having extended, capillary passageways therein.

To prepare a metallic article having an opening or passageway therein, it is common to prepare a core having a configuration corresponding to the configuration of the opening desired in the metallic article, to form the article around the core by electro-deposition, casting, or the like, and to then chemically dissolve the core with a suitable reagent contained in an open vessel. This method is satisfactory for the preparation of many articles. However, when used to prepare articles with narrow, extended passageways, such as small diameter or capillary tubes and the like, the method fails. It has been found that only the small end portions of the long, thin cores associated with such articles can be removed by the reagent.

The present invention provides a method for overcoming the limited core removal attendant to the prior method. In accordance with the present invention, the article and embedded core are placed in a rigid vessel containing a suitable reagent, the vessel is rigidly sealed and then heated, whereby it is found that the long, thin core is completely removed.

Accordingly, the primary object of the present invention is to provide a method of preparing articles having extended, capillary passageways therein.

Another object is to provide a method of removing long, thin cores from articles in which they are embedded.

Still another object is to provide a method of preparing small diameter tubes and the like in a simple and economical manner.

Other objects and many of the attendant features of the present invention will become apparent when the following description is read in conjunction with the accompanying drawings, wherein.

Figure 1:
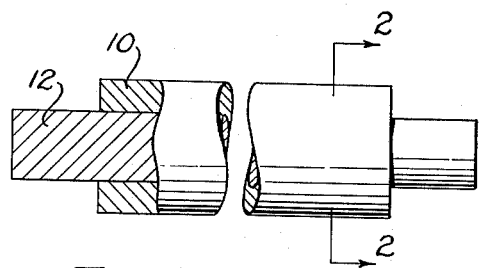
FIG. 1 is an elevational view, partly in section, of an article and embedded core constructed in accordance with the present invention.
Figure 2:
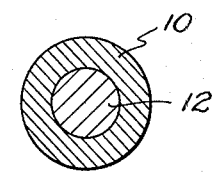
FIG. 2 is a sectional view taken on the line 2—2 of FIG. 1.

In FIGS. 1 and 2 there is illustrated an exemplary article 10 formed about a core 12 by any suitable process such as electro-deposition, casting, molding or the like. The article 10 is illustrated as comprising a long, thin-walled tube although it could comprise any configuration requiring a narrow opening or passageway extending either partially into the interior thereof, or completely therethrough. The core 12 is illustrated as comprising a long, thin rod of wire of circular cross-section, although it could comprise any elongated member of varying cross section, some portion of which is so narrow as to be unremovable by the conventional process described hereinbefore.

In accordance with conventional practice, the article 10 and core 12 are prepared from two different materials that are unequally dissolvable by a suitable reagent, such as an acid, base, organic solvent or the like, so that the core 12 may be chemically dissolved while the article 10 is slightly changed in dimensions if at all. The selection of materials for preparing the article and core, and the selection of a suitable reagent are within the skills of the art and form no part of the present invention.

When the article 10 and embedded core 12 of FIGS. 1 and 2 are immersed, in accordance with prior practice, in an open vessel containing the selected reagent, it is found that only small end portions of the core 12 are dissolved, even when the reagent is raised to a high temperature for a long period of time. While the exact cause of this failure of the reaction to proceed as expected is not known, it is believed that the failure is primarily due to the capillary nature of the passageway being formed. It appears that the solid and gaseous reactants formed in the narrow passageway are prevented from flowing out of the passageway by the capillary attraction of the reagent. The reactants eventually form a "block" and prevent the reagent from reaching the core. It further appears that the "block" cannot be dislodged by boiling or otherwise agitating the reagent.

Figure 3:
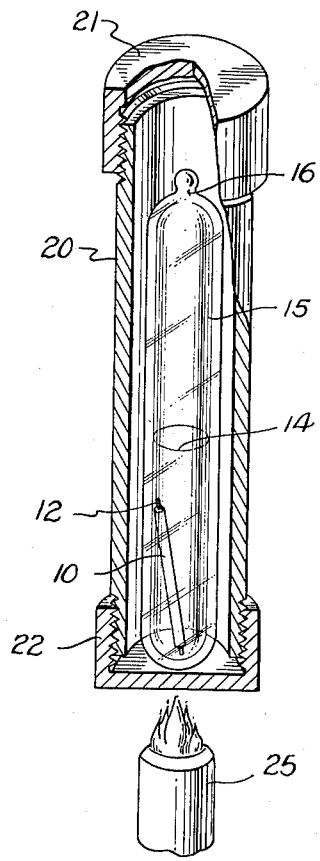
FIG. 3 is a perspective view, partly in section, of an exemplary apparatus for removing the core from the article shown in FIGS. 1 and 2, all in accordance with the method of the present invention.

In FIG. 3, there is illustrated an exemplary apparatus for practicing the present invention whereby the core 12 of FIGS. 1 and 2 is completely dissolved. The article 10 and embedded core 12 are immersed in the selected reagent 14 which is contained in a suitable rigid vessel 15, such as a thick-walled Pyrex tube or the like. The vessel 15 is sealed in a rigid and gas-tight manner at 16 by any suitable means well known in the art. The sealed vessel 15 is fitted into a safety jacket comprising a tube 20 of iron or the like, having end caps 21, 22 fastened thereonto as by screwing or the like. Heat is applied to this jacket by any suitable means, such as the Bunsen burner 25.

After a sufficient length of time as may be determined by those skilled in the art by trial-and-error methods, the burner 25 is removed, and the jacket 20 and vessel 15 are cooled. When the vessel 15 is broken and the article 10 examined, it is found that the core is completely removed therefrom, thereby providing the desired tube.

While the exact reasons for the success of the method of the present invention are not known, and are not necessary to the practice thereof, it is believed that the following analysis is helpful in understanding the invention. By sealing the container of reagent in which the article and embedded core are immersed, and heating same in accordance with the principles of the invention, the temperature and pressure inside the container are raised, whereby the solubilities of the aforementioned reactants in the reagent apparently are greatly increased, so that they remain in solution and flow out of the passageway, permitting the reagent to continue acting on the core.

The following example illustrates the invention:

Two 1½ inch lengths of No. 24 copper wire (0.02 inch diameter) were each electroplated with gold to a thickness of 0.0002 inch. Treatment of the first of these with hot concentrated nitric acid in an open vessel removed only 0.125 inch of the copper core at each end of the gold tube in 72 hours. The other of these articles was sealed in a glass tube containing concentrated nitric acid. The tube and contents were heated in a furnace at 150° C. for three days. In this case, the copper core was completely removed from the gold tube.

Since various changes could be made in the above method without departing from the scope of the invention, it is intended that all matter contained in the above description or shown in the accompanying drawings shall

What is claimed is:
1. The method of preparing an article having an extended, capillary passageway therein, which comprises:
   (a) forming said article on a long, thin core having a configuration corresponding to the configuration of said passageway,
   (b) inserting said article and embedded core into a rigid vessel containing a reagent in which said core is more dissolvable than said article,
   (c) immersing said article and embedded core in said reagent,
   (d) sealing said vessel in a rigid manner,
   (e) heating said sealed vessel to about 150° C. to raise the temperature and pressure inside said sealed vessel to greatly increase the solubilities of the reactants of said reagent and said embedded core, and continuing said heating until said core is completely dissolved,
   (f) cooling said sealed vessel,
   (g) unsealing said vessel, and
   (h) removing said article from said vessel.

2. The method of preparing a gold article having an extended, capillary passageway therein, which comprises:
   (a) forming said gold article on a long, thin copper core having a configuration corresponding to the configuration of said passageway,
   (b) inserting said gold article and embedded copper core into a rigid vessel containing concentrated nitric acid,
   (c) immersing said gold article and embedded copper core in his nitric acid,
   (d) sealing said vessel in a rigid manner,
   (e) heating said sealed vessel to about 150° C. for about 72 hours, whereby said core is completely dissolved,
   (f) cooling said sealed vessel,
   (g) unsealing said vessel, and
   (h) removing said gold article from said vessel.

References Cited by the Examiner
UNITED STATES PATENTS

| | | | |
|---|---|---|---|
| 1,823,709 | 9/31 | Taylor | 76—107 |
| 1,827,766 | 10/31 | Rosenburgh | 29—544 |
| 2,022,234 | 11/35 | Everett. | |
| 2,047,555 | 7/36 | Gardner. | |
| 3,099,081 | 7/63 | Lalak | 29—423 |

WHITMORE A. WILTZ, Primary Examiner.
THOMAS H. EAGER, Examiner.